United States Patent
Bansal et al.

(10) Patent No.: US 11,381,472 B2
(45) Date of Patent: Jul. 5, 2022

(54) VISUALIZATION OF INTRA-VEHICULAR COMMUNICATIONS NETWORKS

(71) Applicant: Faraday & Future Inc., Gardena, CA (US)

(72) Inventors: Abhijit Bansal, Los Angeles, CA (US); Douglas D. Chidester, San Pedro, CA (US); Shan Deng, Arcadia, CA (US); Jana Mahen Fernando, Torrance, CA (US); Matthew K. Lubbers, Manhattan Beach, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/719,921

(22) Filed: Sep. 29, 2017

(65) Prior Publication Data

US 2019/0052543 A1 Feb. 14, 2019

Related U.S. Application Data

(60) Provisional application No. 62/402,834, filed on Sep. 30, 2016, provisional application No. 62/402,830, filed on Sep. 30, 2016.

(51) Int. Cl.
*H04L 41/22* (2022.01)
*H04L 41/08* (2022.01)
(Continued)

(52) U.S. Cl.
CPC .............. *H04L 41/22* (2013.01); *H04L 12/40* (2013.01); *H04L 12/40013* (2013.01);
(Continued)

(58) Field of Classification Search
CPC . H04L 41/22; H04L 12/40013; H04L 41/082; H04L 41/0883; H04L 41/12; H04L 2012/40215; H04L 2012/40234
See application file for complete search history.

(56) References Cited

U.S. PATENT DOCUMENTS

| 2002/0091475 A1* | 7/2002 | Hashimoto | B60L 3/12 |
| | | | 701/48 |
| 2002/0135610 A1* | 9/2002 | Ootani | G06F 3/0481 |
| | | | 715/734 |

(Continued)

*Primary Examiner* — Jeffrey M Rutkowski
*Assistant Examiner* — Jasper Kwoh
(74) *Attorney, Agent, or Firm* — Veros Legal Solutions, LLP

(57) ABSTRACT

Methods, systems, computer-readable media, and apparatuses are presented for computer-assisted visualization of network devices. One example involves receiving a plurality of standardized network description files describing a plurality of vehicular communication networks connecting a plurality of electronic control units (ECU) for a vehicle. Each of the plurality of standardized network description files may describe a vehicular communication network in the plurality of vehicular communication networks. Each vehicular communication network may comprise a subset of the plurality of ECUs and one or more network communications paths interconnecting the subset of ECUs. The example can further involve automatically generating, based on the standardized network description files, a visual topology representation of the plurality of vehicular communication networks connecting to the plurality of ECUs. The visual topology representation may include at least one ECU connected to at least two vehicular communication networks in the plurality of vehicular communication networks.

17 Claims, 10 Drawing Sheets

(51) Int. Cl.
    *H04L 41/082*    (2022.01)
    *H04L 12/40*     (2006.01)
    *H04L 41/12*     (2022.01)

(52) U.S. Cl.
    CPC ........ *H04L 41/082* (2013.01); *H04L 41/0883* (2013.01); *H04L 41/12* (2013.01); *H04L 2012/40215* (2013.01); *H04L 2012/40234* (2013.01); *H04L 2012/40273* (2013.01)

(56) References Cited

U.S. PATENT DOCUMENTS

| | | | | |
|---|---|---|---|---|
| 2005/0021632 | A1* | 1/2005 | Rachlin | H04L 41/00 709/206 |
| 2007/0076593 | A1* | 4/2007 | Sakurai | B60W 50/0205 370/219 |
| 2008/0022259 | A1* | 1/2008 | MacKlem | G06F 8/34 717/113 |
| 2008/0127056 | A1* | 5/2008 | Java | G06F 8/30 717/106 |
| 2010/0031212 | A1* | 2/2010 | Dong | G06F 17/50 716/100 |
| 2010/0257298 | A1* | 10/2010 | Cummings | G06F 13/28 710/301 |
| 2013/0211623 | A1* | 8/2013 | Thompson | B60L 3/0069 701/2 |
| 2014/0365028 | A1* | 12/2014 | Lee | G07C 5/008 701/1 |
| 2015/0331422 | A1* | 11/2015 | Hartung | H04L 12/40013 701/23 |
| 2016/0219051 | A1* | 7/2016 | Morita | H04L 63/0876 |
| 2017/0155580 | A1* | 6/2017 | Ramanujan | H04L 45/02 |
| 2017/0195982 | A1* | 7/2017 | Park | H04W 56/0015 |
| 2018/0063098 | A1* | 3/2018 | Robins | G06F 21/44 |

* cited by examiner

Auto-Gen Tool — 400

600

[ Add ] [ Remove ]

| File | Path | DB Name | Bus Name | Bus Type | Bus ID | ECU | Driver | Bus No. |
|---|---|---|---|---|---|---|---|---|
| motor | C:\Users | string | string | CAN | 66 | BPG | FF | 3 |
|  |  |  |  |  |  |  |  |  |
|  |  |  |  |  |  |  |  |  |
|  |  |  |  |  |  |  |  |  |

☑ Import Checker [ 100% ] Check: Finished

◯ Parser Checker [ 100% ] Check: Finished

◯ .DBC Checker [ 60% ] Check: In Progress

[ File Import Checker ] [ File Parser Checker ] [ File Naming Convention Checker ]

| Checked Result | Category | Location | Details |
|---|---|---|---|
| Warning! | String | Bus usage | Current bus usage exceeds 40% |
|  |  |  |  |
|  |  |  |  |
|  |  |  |  |

*FIG. 6*

Auto-Gen Tool

| File | Path | DB Name | Bus Name | Bus Type | Bus ID | ECU | Driver | Bus No. |
|------|------|---------|----------|----------|--------|-----|--------|---------|
| motor | C:\Users | string | string | CAN | 66 | BPG | FF | 3 |
| | | | | | | | | |
| | | | | | | | | |
| | | | | | | | | |

| Protocol Butter File | C Code File | Gateway Code File | DBC File |
|----------------------|-------------|-------------------|----------|
| ☐ Select All | ☐ Select All | ☐ Select All | ☐ Select All |
| ☐ Enum Table | ☐ CAN_num | ☐ BUS_gateway | ☐ Merged DBC File |
| ☐ Signal .proto | ☐ CANSig_Bus | ☐ BUS_Msg.cpp | ☐ Ethernet DBC File |

Warning: duplicate message id
Warning: the originating ECU for the signal are more than one

*FIG. 7*

VISUALIZATION OF INTRA-VEHICULAR COMMUNICATIONS NETWORKS

CROSS-REFERENCE TO RELATED APPLICATIONS

This application claims the benefit of U.S. Provisional Application No. 62/402,830, filed Sep. 30, 2016, and U.S. Provisional Application No. 62/402,834, filed Sep. 30, 2016, the entireties of which are hereby incorporated by reference.

BACKGROUND

A vehicle may include one or more physical communication networks to carry information and messages between different electronic control units (each an "ECU") within the vehicle. The physical networks may include various types of communication networks, such as controller area network (CAN), local interconnect network (LIN), Ethernet network, etc. A message transmitted from ECU to one or more other ECUs may travel within a network and/or traverse multiple networks within the vehicle, Some ECUs may exist on multiple networks and/or multiple types of networks. As the complexity of intra-vehicular communications networks increases, keeping track of the code generated for the multitudes of ECUs becomes unwieldy. Improvements are needed to better handle the development of ECU code design for modern intra-vehicular networks.

SUMMARY

Various examples are described for computer-assisted visualization of network devices. One example involves receiving a plurality of standardized network description files describing a plurality of vehicular communication networks connecting a plurality of electronic control units (ECU) for a vehicle. Each of the plurality of standardized network description files may describe a vehicular communication network in the plurality of vehicular communication networks. Each vehicular communication network may comprise a subset of the plurality of ECUs and one or more network communications paths interconnecting the subset of ECUs. The example can further involve automatically generating, based on the standardized network description files, a visual topology representation of the plurality of vehicular communication networks connecting to the plurality of ECUs. The visual topology representation may include at least one ECU connected to at least two vehicular communication networks in the plurality of vehicular communication networks.

In addition, the example may further include receiving an input from a user to select a network message defined by one or more of the standardized network description files. The example may further involve automatic generation of a visual signal path representation for the selected network message. The visual signal path representation may illustrate (1) an originating ECU, (2) at least one destination ECU, and (3) a plurality of routes connecting the originating ECU to the at least one destination ECU through at least a portion of the plurality of vehicular communication networks.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 4-7 show example simulated screens of a software tool for automatic definition of intra-vehicular communications networks;

DETAILED DESCRIPTION

Figure 1:
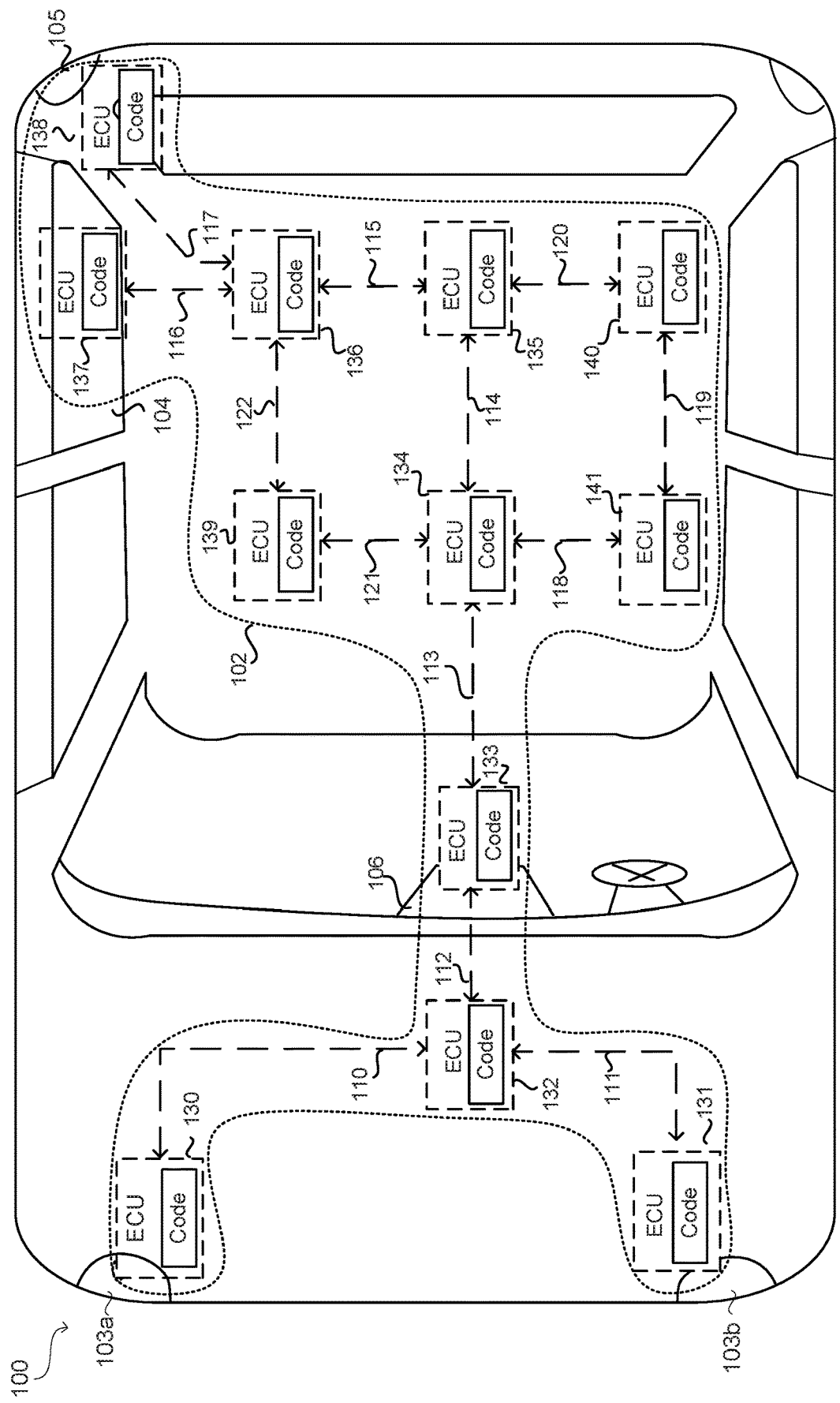
FIG. 1 illustrates an example environment in which various aspects of the disclosure can be implemented.

Examples are described herein in the context of automatic definition of intra-vehicular communications network. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will of course be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In one illustrative example for automatic definition of intra-vehicular communications networks, a developer desires to create new messages and bit fields that can be exchanged between ECUs within an electric vehicle over multiple different communication networks, including multiple controller area network (CAN) networks, multiple local interconnect network (LIN) networks, and multiple Ethernet networks. Such messages and bit fields are typically created in a requirements definition document and then implemented in software by the developer, such as by writing program code for each of the ECUs within the vehicle such that each ECU is able to properly handle the messages and bit fields. However, in this example, the developer instead uses a graphical design tool to update a definition file for each of the networks that will handle the new messages and bit fields, as well as the previously-defined messages and bit fields. The definition file includes information describing each of the new messages and bit fields, as well as information about which ECUs will send and receive the new messages and bit fields.

To update the definition file, the developer interacts with the graphical design tool to create a graphical representation of one or more of the networks defined for the vehicle based on the then-current definition file. The graphical design tool presents to the developer graphical representations of different ECUs present in the network, messages defined for use within the network, and bit fields that can be carried in one or more of the messages. To define a new message or bit field (or even new ECU), the developer selects an option from a graphical user interface (GUI) of the graphical design tool to define a new message. The developer then enters information to describe the message, such as by selecting an ECU that will originate and transmit the message, and one or more ECUs that it will be transmitted to. The developer also enters information about new fields in much the same way—she selects an option to add one or more bit fields to the network definition and enters the definition of the information to be carried in the bit field, such as bit field widths, field names and constraints, etc.

In addition, the GUI provides the developer the ability to graphically adjust the network topology, such as by adding or removing ECUs, changing connections between ECUs, selecting one or more routes through the network for one or more messages or data items within messages. In this example, the developer elects to connect an ECU to two different networks.

After the developer has entered the definitions of any new messages or message fields, the graphical design tool updates definitions for one or more ECUs within the network. In addition, if any of the new messages or message fields will traverse multiple different networks within the vehicle, the graphical design tool updates ECU, message, and bit field definitions in other network definitions for the vehicle. By doing so, the graphical design tool ensures that a common, consistent definition is used across all networks, eliminating the opportunity for the developer to make errors in propagating the new messages and bit fields to other network definition files. In addition, because the developer has connected one of the existing ECUs to an additional network, the graphical design tool updates the network definition file for the additional network to include the ECU.

After all network definition files have been updated, the developer selects another option in the GUI to generate program code for each ECU in each network. The program code generated by the graphical design tool, in this example, is in the C programming language, though any suitable language may be used. The program code files are then compiled using the appropriate compiler for the target ECU, and linked into any needed libraries to create executable program code files usable by the corresponding ECU within the vehicle. The developer then saves the changes made to the definition files, obtains the executable program code files, and loads them onto the ECUs within the vehicle.

This illustrative example is given to introduce the reader to the general subject matter discussed herein and the disclosure is not limited to this example. The following sections describe various additional non-limiting examples and examples of systems and methods for vehicle infotainment systems with multiple user accounts.

Referring now to FIG. 1, FIG. 1 shows an example vehicle 100 with multiple ECUs 130-141 installed to control various systems within the vehicle 100. Each ECU 130-141 includes a processor and memory as well as one or more communication interfaces or device interfaces as described in more detail with respect to FIG. 8. In this example, the vehicle is an electric car, however, in other examples, the vehicle may be any suitable vehicle, such as a car, truck, van, train, aircraft, watercraft, spacecraft, etc. The ECUs 130-141 depicted, as well as other ECUs that are not shown, in this example control various subsystems, such as door locks, windows, climate control, alarm systems, drivetrain control, brake systems, etc. To perform these functions, the ECUs may pass messages throughout one or more communication networks or buses. When a message is received by an ECU, it may determine whether information within the message, e.g., one or more fields, such as a bit field, is destined for the ECU or for another ECU.

As shown in FIG. 1, the vehicle 100 includes a vehicle communication system 102 which enables communication between various components of the vehicle 100, such as front lights 103a and 103b, rear door 104, and rear right signal 105, as well as with a driver, such as via a graphical user interface (GUI) 106 executing on a computing device. As described later in greater detail and in conjunction with FIG. 2, a vehicle communication system 102 may include various communication networks such as 110-122 (e.g. buses, Ethernet, etc.) used by various ECUs, such as ECUs 130-141.

Figure 2:
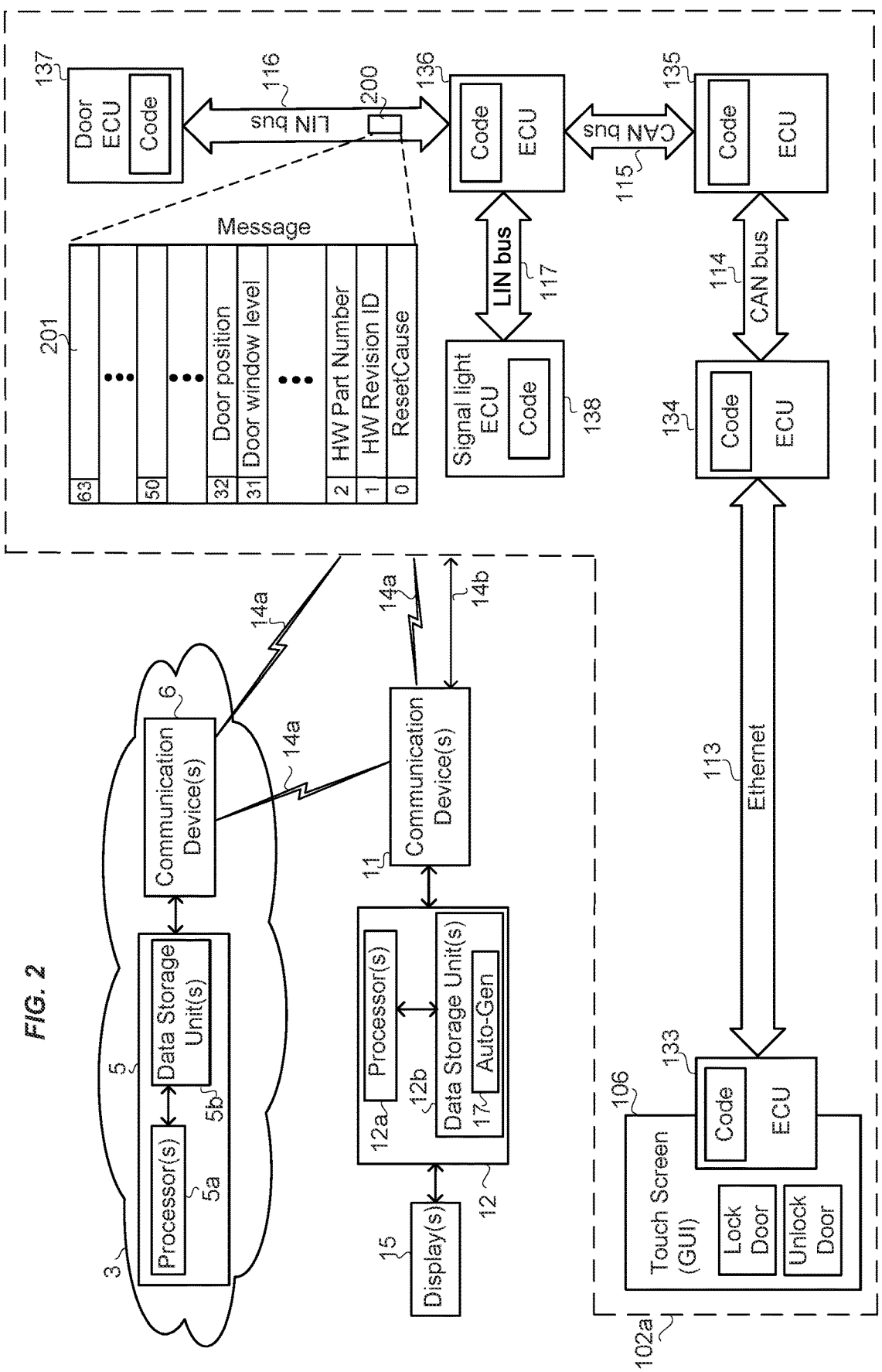
FIG. 2 includes a block diagram further illustrating various components for implementing aspects of the disclosure.

FIG. 2 includes a block diagram further illustrating an operating environment for one or more ECUs and communication networks. For simplicity of illustration, vehicle communication system 102a represents a portion of the vehicle communication system 102 shown in FIG. 1. Typically, ECUs communicate with each other using network messages, such as message 200, which are transmitted using the available communication networks. Each ECU executes program code which includes instructions for generating, processing, transmitting, and receiving messages on one or more of the available communication networks. For example, each ECU may include specially-written program code for handling each available message, or information extracted from such messages, in a particular way. An ECU associated with a car door, for example, may include program code for receiving and processing information related to locking or unlocking a door to command a door locking mechanism to activate. However, an ECU related to a turn signal may be programmed to identify a message with contents related to door locking and to forward the message to another ECU. Thus, each ECU may include programming to handle different messages, even if the message is not specifically intended for the ECU.

Information about the ECUs, messages, message contents, and other information for a particular network may be stored in a file, such as a standard network description (SND) file. As a vehicle 100 may include multiple different networks, a vehicle may have multiple associated SND files, one each per network configured within the vehicle. Thus, as can be seen in the communication system 102a of FIG. 2, available networks include an Ethernet network 113, two CAN buses 114, 115, and two LIN buses 116, 117. Each of these networks is configured according to its corresponding SND file. It should be appreciated that the SND file for a network is not necessarily available on any ECU within the network. Rather, the SND file is used to properly configure the network and each ECU and to assist developers in writing program code, for example to handle the various messages at the different ECUs.

In this example, a network message, such as example message 200, which is in transit from ECU 136 to ECU 137, may include various fields 201. Such fields may be of fixed size, such as the 64 bit-wide fields as shown in FIG. 2. However, other example messages may include fields of variable size. For example, a field may be configured to store 256 bits of information, while other fields may be configured to store 32 bits of information. Such information may be defined in the corresponding SND file for the network, along with other information pertaining to ECUs and routing of messages between ECUS.

Messages may be defined to provide status information, commands, error information, etc. For example, the example message 200 shown in FIG. 2 is a "Passenger Door Status" message, which may include status information about a vehicle component, such as an open or closed status of rear door 104. Each of the 64 fields in the message 200 (numbered 0 to 63) may include data associated with specific door status information, such as for example "door position" (field 32), "door's window level position" (field 31), Hardware Part Number (field 2), Hardware Revision ID (field 1), Reset Cause (field 0), etc. When a door status message is generated, e.g., in response to a message requesting door status, the ECU associated with the particular door receives the request from the requesting ECU and generates the door status message, populates it with the appropriate information, and transmits the message to the requesting ECU. Such processing is defined by the specific program code specifically written for, and executed by, the ECU associated with the door.

For example, the GUI touch screen 106 allows a driver to lock (or unlock) the rear door 104 using a button displayed on the touch screen 106. In this process, a "lock door" message 200 is sent through the Ethernet 113 from source ECU 133 to the door ECU 137. To route the message to the proper destination, the message follows a route designated in the SND file and implemented in the software of the various ECUs within the communications system 102*a*. In this example, the "lock door" message is generated by ECU 133 in response to the driver pressing the "Lock Door" button on the touch screen 106. The ECU 133 executes program code associated with sending the "lock door" message, which indicates that the message is sent via Ethernet network 113 to ECU 134. The message then traverses the Ethernet network 113 and arrives at ECU 134. ECU 134 receives the message and executes its own program code to process the message. ECU 134 determines the next step on the route is to ECU 135 via CAN bus 114. ECU 134 then formats the message appropriate for communication across the CAN bus 114 and transmits it to ECU 135. This process continues until the message ultimately arrives at the Door ECU 137, which processes the message. If it is able to lock the door, it does so by activating a door locking mechanism.

Because each ECU has its own specific program code for handling messages defined for the network(s) it is connected to, when a developer decides to make a change to the SND file to change a characteristic of the network, it may require modifying the program code for all ECUs connected to the network. Changes to the SND file may include adding a new message, changing the definition of a message, adding an ECU, removing an ECU, changing a route for a message, etc. For example, an engineer may decide to reorganize the door status message and move the "door position" field from field 32 to field 50. To implement this change, the SND file is modified, and then the program code for each ECU in the associated network must be modified such that each expects to find "door position" at field 50 in the door status message, rather than field 32. During the process of designing the communications system 102*a* for a vehicle, such changes may be made for a variety of reasons; however, such changes will require significant effort to not only rewrite the program code for each ECU, but also to test the entire network to ensure all of the changes were implemented properly. Further, successive changes require additional re-writes of the ECU program code.

Further, because a communications system 102*a* may include many different networks, which may each carry messages originating on other networks, changes made to one SND file may need to be propagated to other SND files as well, which then requires rewriting of the program code for each affected network. Thus, to reduce the impact of network configuration changes and to reduce the likelihood of inadvertent errors during such rewrites, examples according to this disclosure may enable a developer to modify one or more SND files using a graphical design tool, verify that the SND files were generated correctly, and automatically generate executable program code for any and all ECUs affected by changes made to the SND files.

Figure 3:
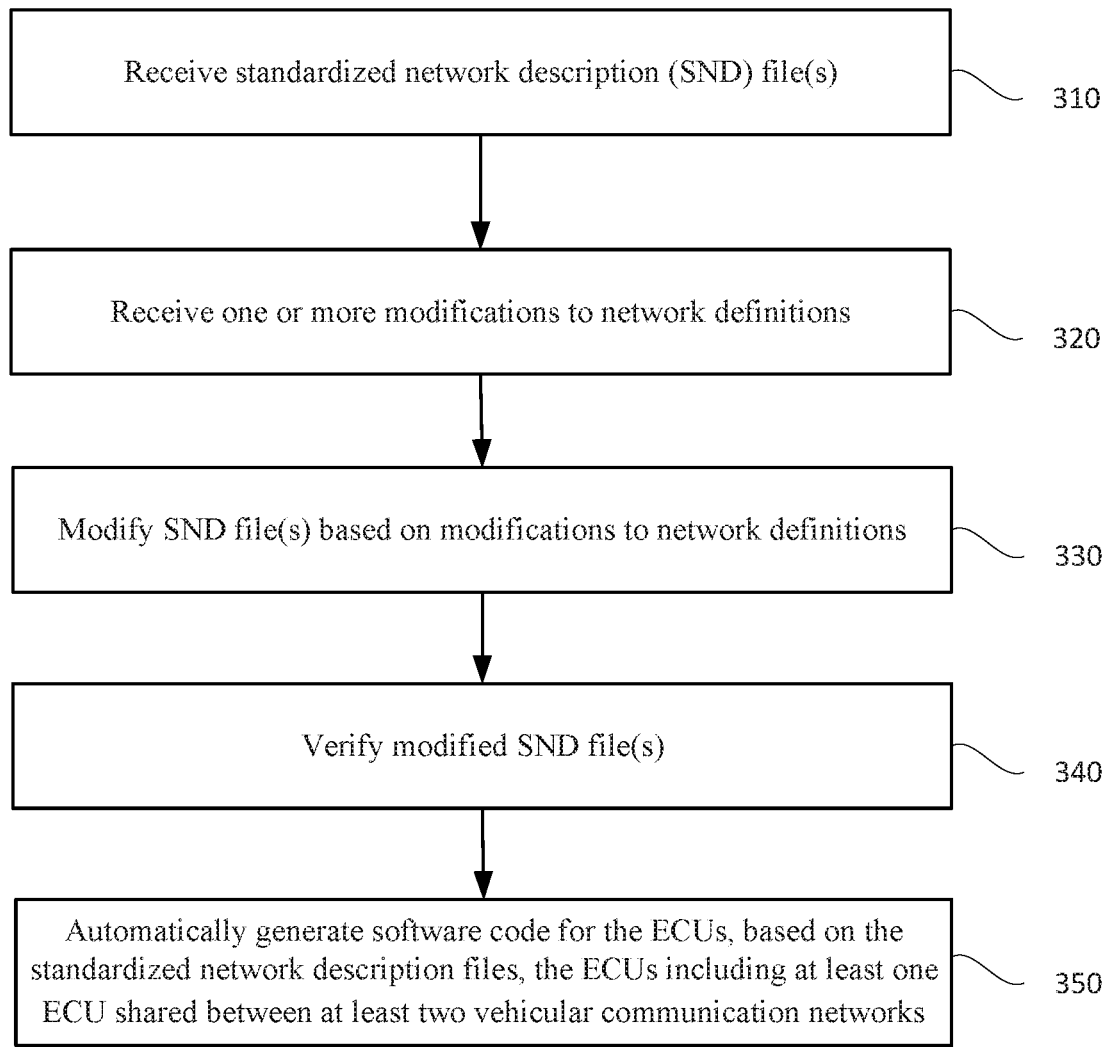
FIG. 3 illustrates an example method for automatic definition of intra-vehicular communications networks.

Referring now to FIG. 3, FIG. 3 shows an example method for automatic definition of intra-vehicular communications networks. The example method of FIG. 3 is performed by a suitable computing device, such as the computing device 1000 shown in FIG. 10.

At block 310, the computing device 1000 receives one or more SND files. For example, the computing device 1000 may access one or more SND files stored on a non-volatile storage medium, such as a hard drive, a cloud storage service, or from a database. In this example, a user accesses the computing device 1000 and executes an application for automatic definition of intra-vehicular communications networks according to this disclosure. After launching the application, the user selects the SND files associated with a particular vehicle.

After selecting the SND files, the application parses each of the SND files and presents information within a GUI to the user. The user may select different SND files to examine, such as in a graphical representation of a network (or part of a network) defined by the SND file. The user may then inspect the network or networks and make modifications to the network.

As discussed above, each received SND file (e.g. files in a standard .DBC or .LDF format) describes a vehicular communication network. The information within the SND may include each ECU within the network, each message and message field available for use within the network, where messages or data fields may originate and their respective destination(s), etc. In some examples, information may be common across multiple SND files. For example, one or more ECUs may be connected to multiple networks (and may be referred to as a "shared" ECU in this disclosure), thus the ECU would be represented in each SND file. Further, messages or message fields may be communicated across multiple networks, and thus may be represented in the SND files for each network in which the message or message field is available. Thus, changes made to an ECU, a message, or a message field may affect multiple SND files.

At block 320, the application receives a modification to one or more network definitions represented by the SND files. For example, the user may add or delete ECUs from one or more networks, or may connect an ECU to a network it was not previously connected to. In some examples, the user may create one or more messages by defining a format for a new message and defining one or more fields for the new message. Defining a message format may include defining a name for the message, a size of the message, an ECU to originate the message, an ECU or ECUs to which the message is destined, or an ordering of fields within the message. Defining one or more fields may include defining names for each field, defining a size of each field, defining an ECU or ECUs that originate information that may be stored in the message field, and defining an ECU or ECUs that are designated to receive information stored in the message field. In some examples, defining a message or message field may further include identifying one or more networks that the message or message field may traverse.

At block 330, the application modifies one or more of the SND files based on the modifications made at block 320. For example, if an ECU was added to one of the networks, the application modifies the SND file corresponding to the network to add the new ECU, such as by adding an entry to the SND file associated with the ECU and including information about the ECU such as an ECU name, one or more networks the ECU is connected to, messages or message fields that the ECU may generate or receive, etc.

At block 340, the application verifies the SND files to ensure that modifications to the network configuration have been correctly propagated across the SND files, or that network constraints have not been violated. For example, the computing device 1000 may determine if a name of each message field in the SND files conforms to the predesignated naming conventions specified for different message fields. In some examples, the application may verify that, for each network an ECU is connected to, it is also present in the SND files corresponding to such networks. If the SND files fail verification, one or more notifications may be displayed to the developer indicating the verification errors. The method may then return to block 320 where the developer may make further modifications to the network configurations to rectify the errors.

At block 350, the application generates program code for each ECU referenced in the SND files. In this example, the application generates human-readable program code, such as C or assembly code; however, in some examples, the application may generate machine-executable code. For example, the application may generate a GET and SET function for each ECU within the SND files that modifies or receives one or more message fields in various messages. For example, the application may generate GET and SET functions for an ECU associated with a door locking mechanism that are configured to obtain information from one or more fields in a message and to set values in one or more fields in the message.

In one example, the generated software code may enable an ECUs to (a) retrieve data, such as in real-time, from a predetermined field in a message, such as data from the "Door position" in field 32 of message 200, and (b) to set the data in the predetermined field to a new value. Such generated software code may enable a developer to change a network configuration and rapidly generate program code to implement those changes, thereby reducing the occurrence of errors due to a programmer incorrectly implementing the changes in program code, or by introducing errors into the network configuration itself.

In this example, the application is configured to generate program code for ECUs that are configured to operate while in communication with multiple communication networks. Thus, the application obtains ECU information from multiple SND files and uses the information from the multiple files to generate the program code based on the ECU information, message information, and field information within the multiple SND files.

After the program code has been generated, the application may further provide the developer the option to compile the program code for the target ECUs and link the compiled code to one or more libraries to generate executable program code. For example, the application may have, or have access to, one or more cross-compilers to compile the program code for the ECUs.

Once machine-executable code has been generated, the developer may transfer the machine-executable code to the ECUs within a vehicle, or it may provide the machine-executable code to one or more simulated ECUs for testing.

In an exemplary embodiment, the generated software code enables ECUs 133-138 to (a) retrieve data, e.g., in real-time, from a predetermined field in a message, such as data from the "Door position" in field 32 of message 200, and (b) set the data in the predetermined field to a new value, such as the correct value prior to above-described shifts in field positions. The generated software code enables the foregoing without the need for a user to know of the actual the position of a field in a message. The generated software code and updating of the standardized network description files thus reduce the occurrence of delivery errors due to above-described shifts in field positions and therefore enable receipt of network message(s) transmitted by an ECU(s), and the relay of network message(s) between the ECUs on shared communication networks.

Referring now to FIG. 4-7, as discussed above, a user may interact with a GUI to view and modify a network configuration. FIGS. 4-7 illustrate example screens from an example application that enables a user to modify and automatically generate intra-vehicular communications networks.

Figure 4:
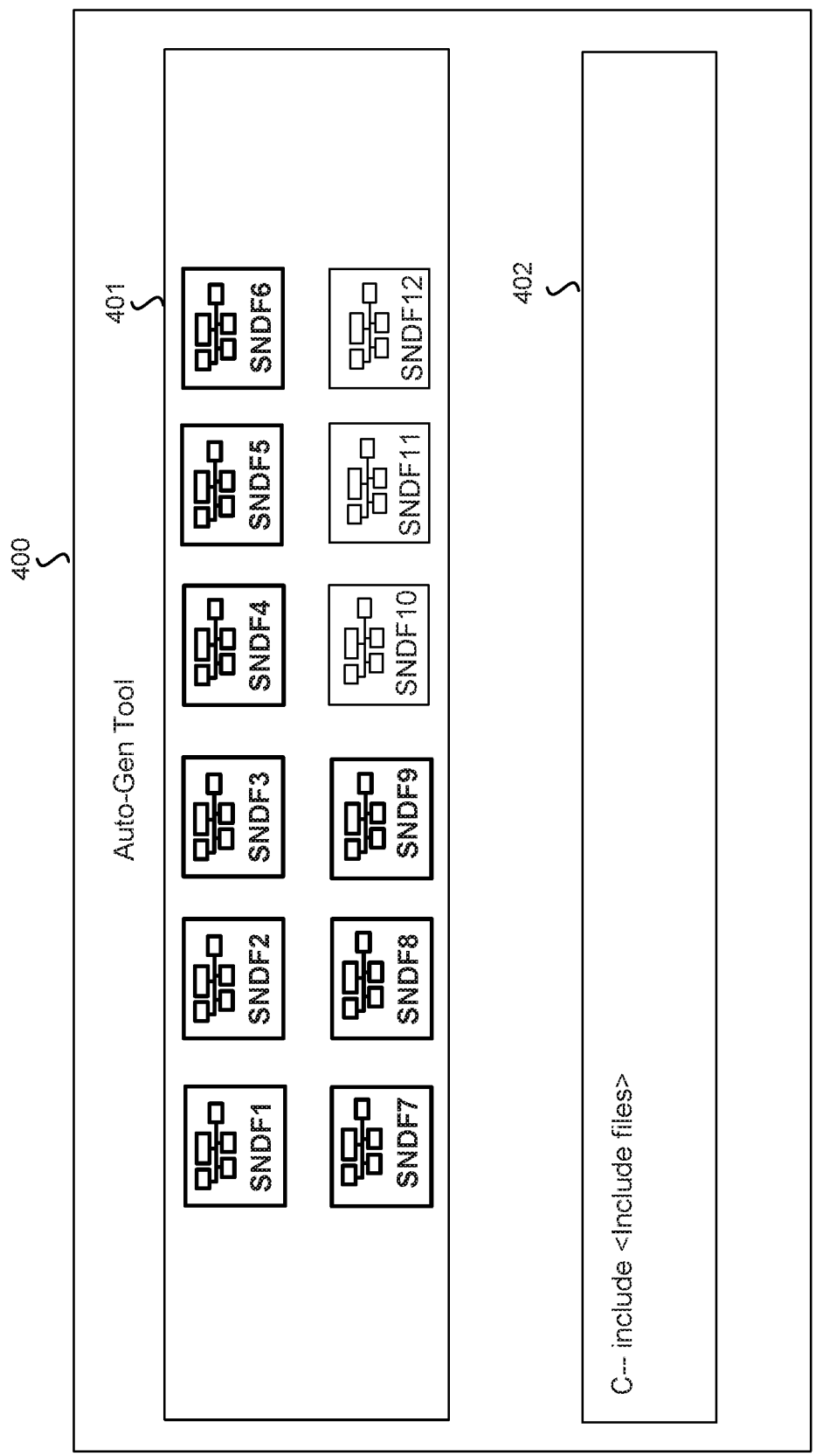

Referring now to FIG. 4, FIG. 4 illustrates an example screen 400 from an application, referred to as an "Auto-Gen Tool" in the Figures. The example screen 400 from FIG. 4 shows a window 401 with representations of multiple SND files that make up an entire communication system configuration for a vehicle. As discussed above, an individual SND file represents a configuration for a single network, e.g., an Ethernet network or CAN bus, while multiple SND files define each of the networks present within a vehicle to create the communication system. In this example, twelve SND files represent the twelve networks that makeup the communications system for a vehicle.

In addition to the available SND files for the communications system, the screen also provides a window 402 to enable a user to provide command-line instructions to generate program code for ECUs within the vehicle's communication system, rather than using the graphical tools provided by the Auto-Gen Tool. The example shown in FIG. 4 illustrates an example that generates C-language program code. The partial command line indicates C-style "include" files that may be referenced while compiling the generated program code.

Figure 5:
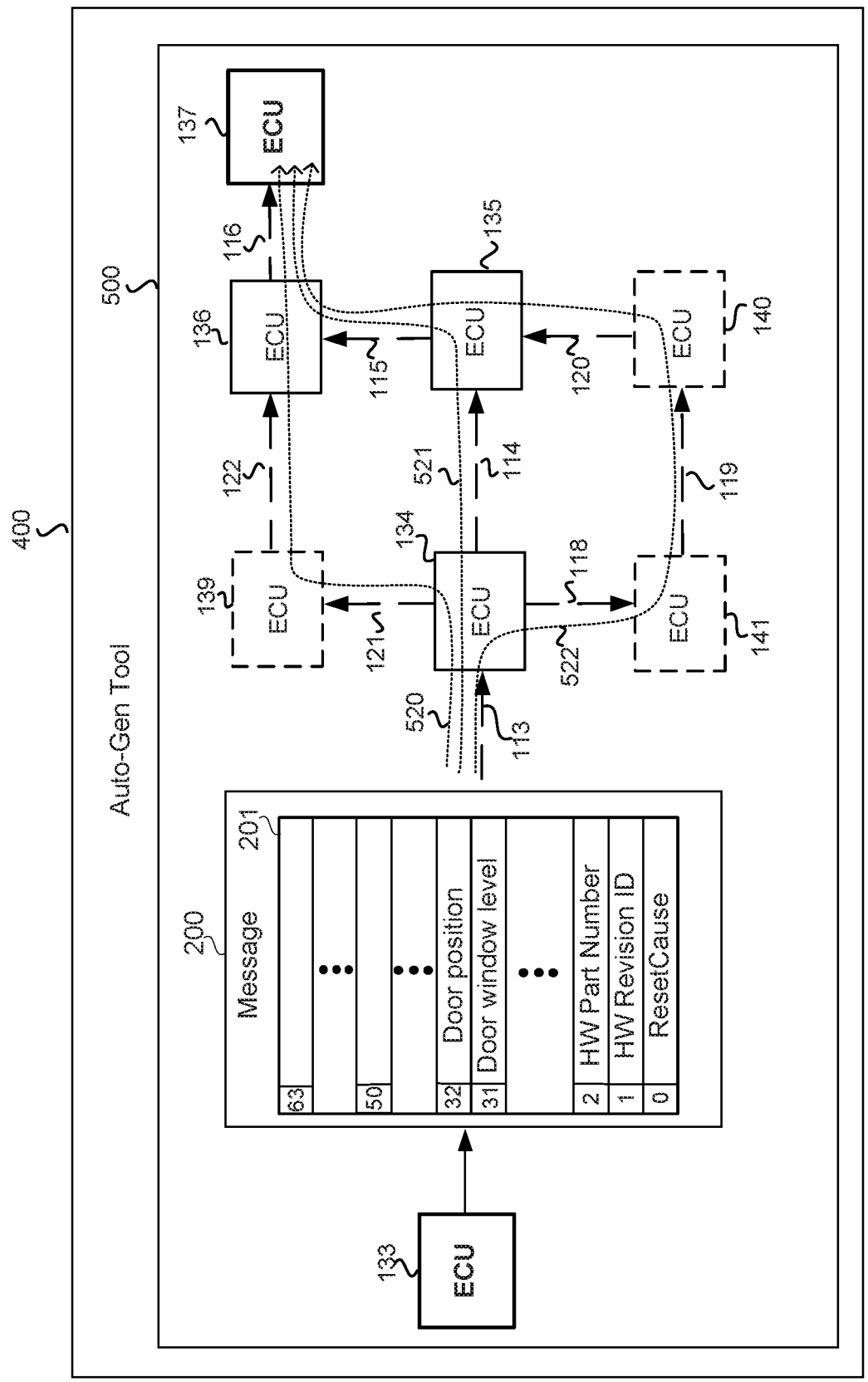

FIG. 5 illustrates an example GUI 500 that provides a graphical representation of a portion of a network based on one of the SND files identified in the screen 400 shown in FIG. 4. In this example, the developer has selected message 200 for closer examination. After selecting the message 200, the GUI 500 presents a graphical diagram showing the ECU 133 from which the message 200 originates, and the ECU 137 that the message 200 is destined for. Further, GUI 500 presents to the developer the current route 521 through the network from the originating ECU 133 to the destination ECU 137, which traverses ECUs 134 and 135. However, the developer is able to review other possible routes 520, 522 and change the route through the network to the destination. Such changes may be made based on other ECUs that may obtain information from the message 200, or may add information to one or more fields in the message 200. Further, while the message itself may be destined for ECU 137, individual fields within the message 200 may be destined for other ECUs within the network. Thus, the GUI 500 may modify a route for the message 200 based on ECUs to which fields in the message 200 are destined. Further, the developer may modify one or more fields within the message 200, which may affect a route selected by the Auto-Gen Tool. Such modifications may result in changes to the SND file, such as described above, and thus, new program code for one or more ECUs may ultimately be generated as described above, such as with respect to FIG. 3.

FIG. 6 illustrates an example verification screen for the Auto-Gen Tool. The verification screen may be employed to verify one or more SND files generated based on modifications made using the screen shown in FIG. 5, or for files that may have been created by hand. For example, the screen 600 illustrates that a SND file may be selected and, when it is imported as shown in FIG. 4, the Auto-Gen Tool may analyze the data within the SND file to determine compliance with one or more naming conventions or other constraints. In this example, the screen 600 also provides the option for the developer to check the SND file for parsing errors, which may indicate that the file is improperly formatted. Further, the developer may cause the tool to verify that the .DBC format (in this example) is correct, such as by verifying that all required information is present and that the information is all properly and consistently assigned throughout the file.

FIG. 7 illustrates options that the developer may select when editing a network configuration in one example. In this example, the developer is presented with the option of selecting characteristics of the network, such as bus name, a bus type, a bus ID, a bus number, one or more ECUs or ECU drivers for controlling devices within a vehicle, etc. In addition, the screen 700 enables the developer to select the type of program code that may be generated, or to select other characteristics of the program code file(s) that may be generated. Further, the screen 700 also provides information regarding error or warning messages based on errors or potential inconsistencies detected within one or more SND files.

Figure 8:
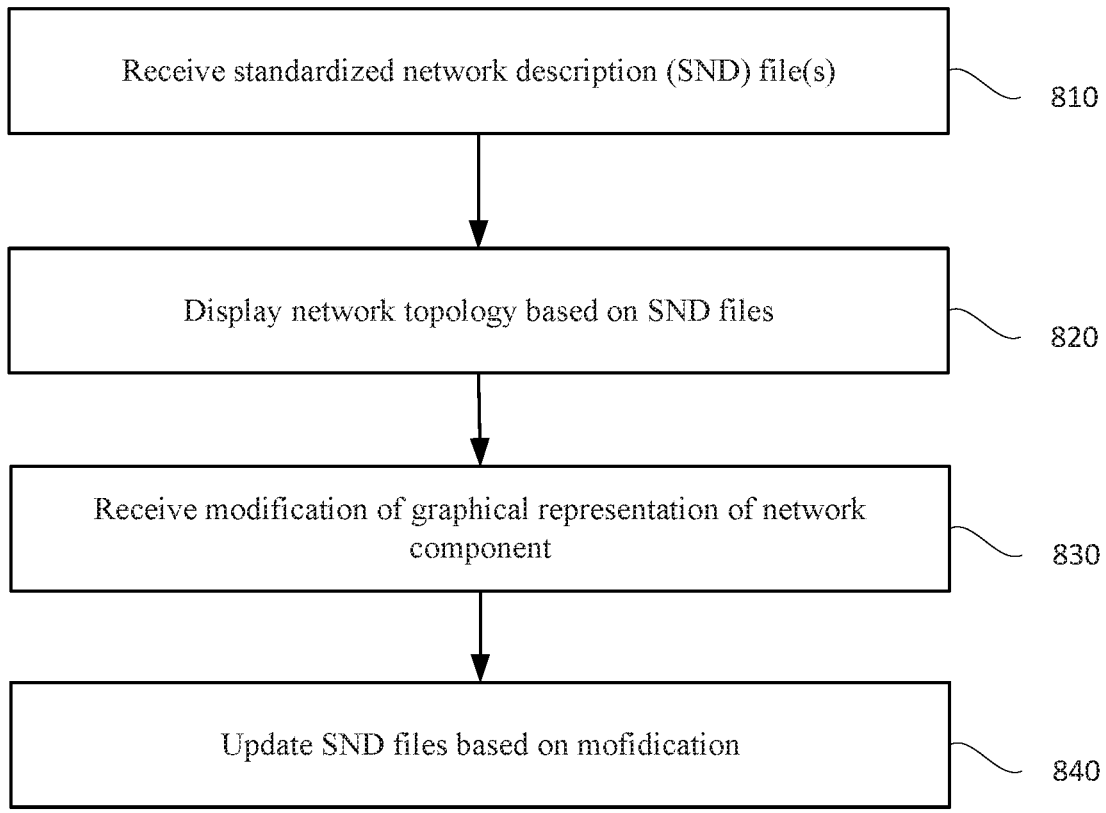
FIG. 8 shows an example method for automatic definition of intra-vehicular communications networks.

Referring now to FIG. 8, FIG. 8 illustrates an example method for automatic definition of intra-vehicular communications networks. The example method of FIG. 8 is performed by a suitable computing device, such as the computing device 1000 shown in FIG. 10.

At block 810, a software tool for automatic definition of intra-vehicular communications networks receives one or more SND files. For example, the computing device 1000 may access one or more SND files stored on a non-volatile storage medium, such as a hard drive, a cloud storage service, or from a database. In this example, a user accesses the computing device 1000 and executes an application for automatic definition of intra-vehicular communications networks according to this disclosure. After launching the application, the user selects the SND files associated with a particular vehicle.

After selecting the SND files, the application parses each of the SND files and presents information within a GUI to the user. The user may select different SND files to examine, such as in a graphical representation of a network (or part of a network) defined by the SND file. The user may then inspect the network or networks and make modifications to the network.

As discussed above, each received SND file (e.g. files in a standard .DBC or .LDF format) describes a vehicular communication network. The information within the SND may include each ECU within the network, each message and message field available for use within the network, where messages or data fields may originate and their respective destination(s), etc. In some examples, information may be common across multiple SND files. For example, one or more ECUs may be connected to multiple networks, thus the ECU would be represented in each SND file. Further, messages or message fields may be communicated across multiple networks, and thus may be represented in the SND files for each network in which the message or message field is available. Thus, changes made to an ECU, a message, or a message field may affect multiple SND files.

At block 820, the software tool displays a graphical representation of at least a portion of a network topology based on one or more of the received SND files. For example, the software tool may display a graphical representation of multiple ECUs and network connections between the ECUs, such as seen in FIG. 5. In some examples, the software tool may display a graphical representation of a message 200 or a message field (or fields) defined for one or more networks. The graphical representation of the message 200 may include one or more ECUs that may be defined within one or more of the SND files as generating, transmitting, or receiving the message or one or more fields within the message.

In some examples, the software application may display a GUI that includes user manipulatable representations of network components, such as ECUs, messages, message fields, routes, networks or buses, etc. For example, referring to FIG. 5, the GUI shown in FIG. 5 illustrates multiple ECUs 133-137, 139-141, multiple network connections 113-116, 118-122 between the ECUs, a message 200, multiple message fields 201, and multiple routes from ECU 133 to ECU 137 through the network. In this example, a user may select and manipulate each of these displayed components. For example, a user may select a message field and drag it to a different location in the memory, thereby assigning a new message field ID to the message field, and causing a resulting change in the SND file for each ECU associated with the message or any message fields affected by the changed location. Thus, the GUI presents an interactive, graphical representation of one or more networks of a vehicle's communication system.

At block 830, the application receives a modification of a graphical representation of a network component. Referring again to FIG. 5, a developer may select any displayed component and access characteristics of the component. For example, the developer may select an ECU and right-click a mouse button to create a context-sensitive menu that provides options to view or edit characteristics of the ECU. Using such a menu, the developer may rename the ECU, change the ECU type, add or remove a network connection from the ECU, change one or more devices controlled by the ECU, etc.

Further, as discussed above, the developer may select and modify one or more messages defined for the network, or may add or delete one or more messages from the network. For example, the developer may add a new ECU to network 2 in a vehicle's communication system and add a message to network 2 by copying it from network 1. The developer may then modify the new ECU to receive information from the message. The developer may then modify the message to add a field of information needed by the new ECU.

After the new ECU is added and the message is modified, the application propagates the changes to the message in network 2 into the same message represented in network 1. Thus, by making these modifications, the developer has modified a message from network 1 to traverse an ECU from network 1 to network 2 and travel to the newly-added ECU. In addition, other ECUs in network 2 may be modified to properly process the message as it traverses network 2 to the newly-added ECU.

Further, as may be seen in FIG. 5, the application may display one or more routes a message may take through a network. Each of these routes may be selected and manipulated, for example, by dragging the route from one ECU to another. Or, rather than directly manipulating a route, the application may present the developer with one or more predefined routes that may be selected. For example, as may be seen in FIG. 5, a message is defined that travels from ECU 133 to ECU 137. As may be seen in FIG. 5, the network is configured to route the message from ECU 133 to ECU 137 by traversing ECUs 134, 135, and 136, each of which is shown with a solid boundary. However, ECUs 139-141 are also displayed, but with hashed boundaries indicating that each of these ECUs may be suitable for use along the route, but are not currently part of the route. In addition, alternate routes 520, 522 are presented to the developer, which may be selected instead of the current route 521.

In some examples, a route may be defined for either a message or a message field. Thus, a message or a message field may be individually selected and associated with an ECU or multiple ECUs. In this example, a user may select the message or message field by clicking on the message or the message field. The user may then drag the message or message field to the ECU to be associated with the message or message field. Once the association is created, the application may automatically generate a route for the message or the message field, or it may generate and display one or more routes and further display a prompt to the user to select one of the displayed routes. In some examples, the application may allow the user to manually select the route for the message or message field to traverse.

At block 840, the application updates one or more SND files based on the modifications. As discussed above, a developer may modify one or more components of a network (or of multiple networks). Such changes may affect other components within the network (or in other networks), which changes may then be propagated to other components with associations to the modified components. After the modifications to the graphical representations have been made, the application may modify the existing SND files, or may generate one or more new SND files based on the modifications made within the application. In some examples, the application may further generate program code based on the modified SND files as discussed above with respect to FIG. 3.

After the method has completed, it may be performed through successive iterations to continue to modify one or more networks within a vehicle's communication system, such as by returning to any of blocks 810-830. For example, a developer may make changes to a network confirmation, generate updated SND files, and then continue to make further modifications to the same network configuration.

Figure 9:
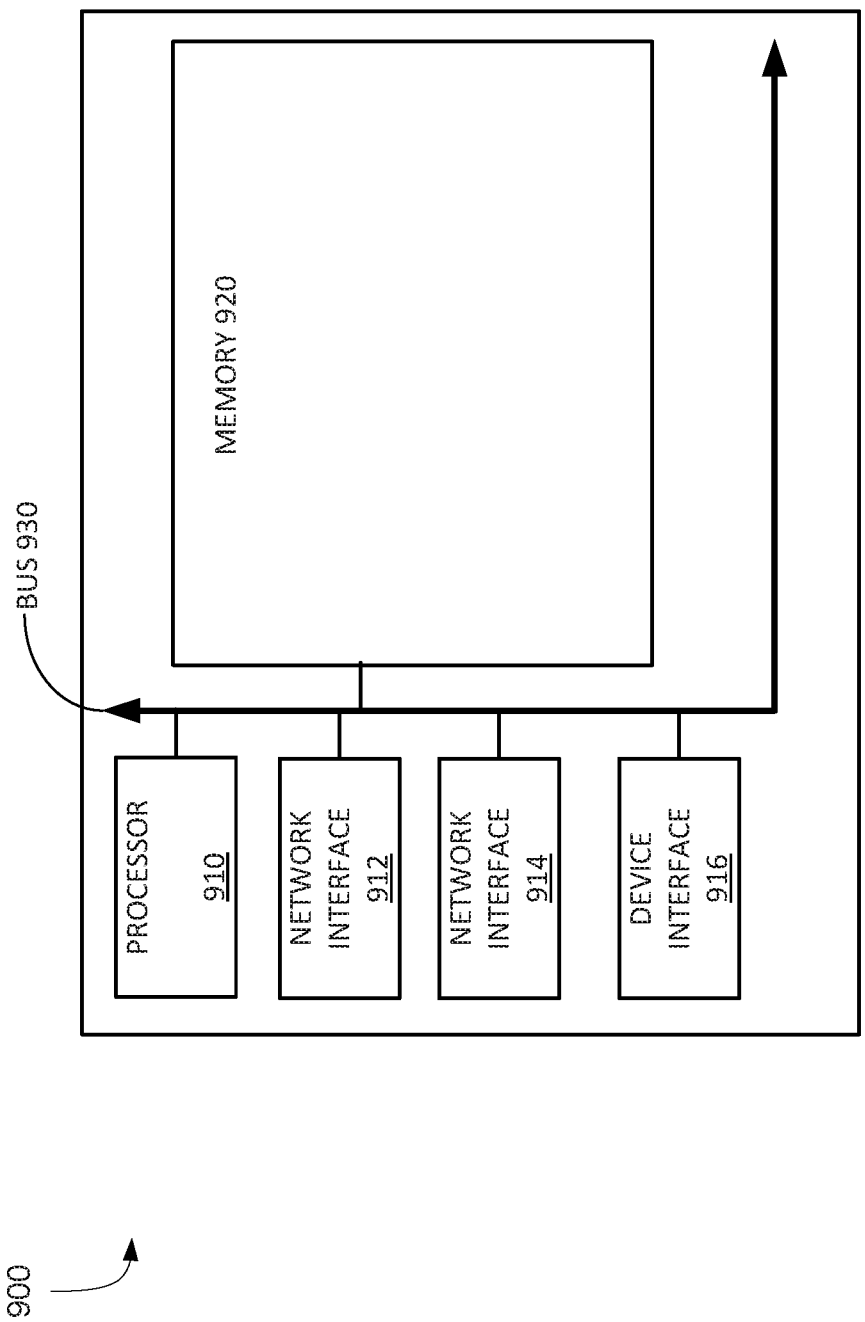
FIG. 9 shows an example ECU according to one example.

Referring now to FIG. 9, FIG. 9 shows an example of an ECU 900 suitable for use with one or more communication networks or vehicles according to the present disclosure. The ECU 900 shown in FIG. 9 includes a processor 910, a memory 920, two communications interfaces 912-914, and a device interface 916. Each of these components is in communication with the others via one or more communications buses 930.

The processor 910 is configured to employ bus 930 to execute program code stored in memory 920, to process messages received via the network interfaces 912-914 and to send control signals to the device interface 916. The device interface 916 provides communications with a device under control of the ECU 900, such as a door locking mechanism, a window mechanism, an exterior light or mirror, a component of the drive train, etc. Thus, the ECU 900 may receive messages via one or more of the network interfaces 912-914, extract information from the messages, and based on the extracted information, command a device to perform an action via the device interface 916.

Figure 10:
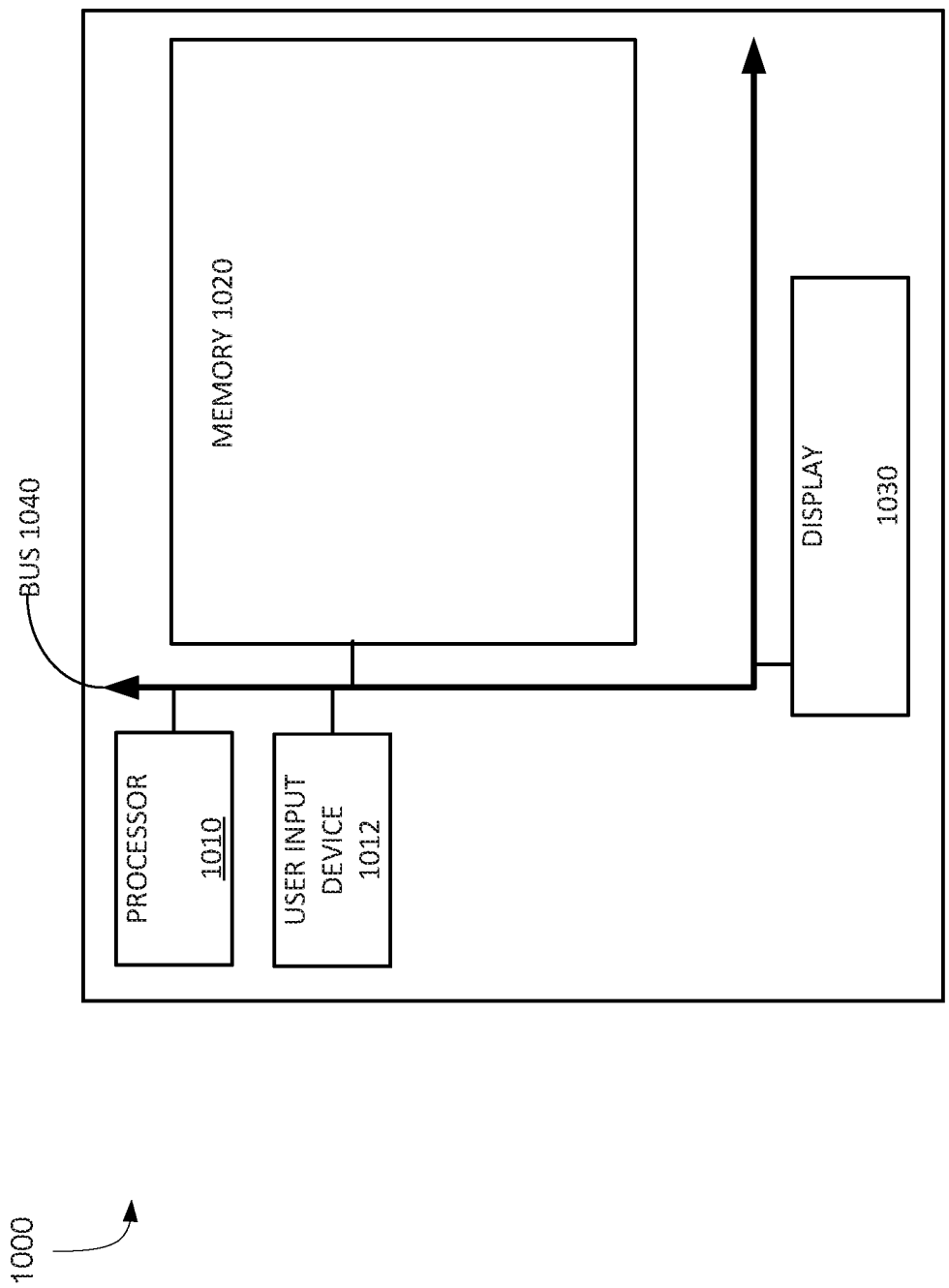
FIG. 10 shows an example computing device.

Referring now to FIG. 10, FIG. 10 shows an example computing device 1000 according to this disclosure. The computing device 1000 shown in FIG. 10 includes a processor 1010, a memory 1020, a user input device 1012, such as a keyboard or mouse, and a display 1030. Each of these components is in communication with the others via one or more communications buses 1040.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method for computer-assisted visualization of network devices, comprising:
receiving a plurality of standardized network description files (SND) describing a plurality of vehicular communication networks connecting a plurality of electronic control units (ECU) for a vehicle, each of the plurality of SND files describing a vehicular communication network in the plurality of vehicular communication networks, each vehicular communication network comprising a subset of the plurality of ECUs and one or more network communications paths interconnecting the subset of ECUs; and
automatically generating, based on the standardized network description files, a visual topology representation of the plurality of vehicular communication networks connecting to the plurality of ECUs, the visual topology representation including at least one ECU connected to at least two vehicular communication networks in the plurality of vehicular communication networks;
receiving an input from a user to select a network message defined by one or more of the plurality of SND files, the selected network message comprising a plurality of fields;
generating a visual signal path representation for the selected network message, the visual signal path representation illustrating (1) an originating ECU, (2) a destination ECU, (3) a plurality of routes connecting the originating ECU to the destination ECU through at least a portion of the plurality of vehicular communication networks, and (4) a plurality of intermediate ECUs traversed by one or more of the plurality of routes;
providing a screen illustrating both representations of the plurality of SND files that make up an entire communication system configuration of the vehicle and a window to enable a user to provide instructions to generate program code for the ECUs within the vehicle's communication system; and
modifying a route for the selected network message based on ECUs to which a first of the plurality of fields is destined, wherein the first of the plurality of fields is destined for an ECU other than the destination ECU;
wherein the plurality of routes connecting the originating ECU to the destination ECU includes (1) a current route and (2) one or more alternative routes; and
wherein a first portion of the intermediate ECUs are along the current route and are each illustrated to have a first characteristic, and a second portion of the intermediate ECUs are not along the current route but are suitable for use along the current route and are each illustrated to have a second characteristic.

2. The method of claim 1, further comprising:
generating a visual message representation for the selected network message, the visual message representation illustrating a plurality of fields of the selected network message.

3. The method of claim 2, further comprising:
receiving an input from the user to modify a particular field in the plurality of fields of the selected network message;
in response to the input from the user to modify the particular field, altering at least one route in the plurality of routes.

4. The method of claim 3, further comprising:
automatically generating one or more modified standardized network description files, the modified standard network description files describing the at least one route in the plurality of routes altered in response to the input from the user to modify the particular field.

5. The method of claim 4, further comprising:
automatically generating software code for one or more of the plurality of ECUs based on the one or more modified standardized network description files.

6. The method of claim 1, wherein the plurality of vehicular communication networks includes at least one controller area network (CAN).

7. The method of claim 1, wherein the plurality of vehicular communication networks includes at least one local interconnect network (LIN).

8. The method of claim 1, wherein the visual signal path representation further illustrates a second destination ECU and a second plurality of routes connecting the originating ECU to the second destination ECU through at least a second portion of the plurality of vehicular communication networks.

9. The method of claim 1 wherein the illustrated second characteristic of the second portion of the one or more intermediate ECUs not along the current route but suitable for use along the current route includes hashed boundaries.

10. A non-transitory computer-readable memory storing a plurality of instructions executable by one or more processors, the plurality of instructions comprising:
instructions that cause the one or more processors to receive a plurality of standardized network description files describing a plurality of vehicular communication networks connecting a plurality of electronic control units (ECU) for a vehicle, each of the plurality of standardized network description files describing a vehicular communication network in the plurality of vehicular communication networks, each vehicular communication network comprising a subset of the plurality of ECUs and one or more network communications paths interconnecting the subset of ECUs; and
instructions that cause the one or more processors to automatically generate, based on the plurality of SND files, a visual topology representation of the plurality of vehicular communication networks connecting to the plurality of ECUs, the visual topology representation including at least one ECU connected to at least two vehicular communication networks in the plurality of vehicular communication networks;
instructions that cause the one or more processors to receive an input from a user to select a network message defined by one or more of the plurality of SND files, the selected network message comprising a plurality of fields;
instructions that cause the one or more processors to generate a visual signal path representation for the selected network message, the visual signal path representation illustrating (1) an originating ECU, (2) a destination ECU, (3) a plurality of routes connecting the originating ECU to the at least one destination ECU through at least a portion of the plurality of vehicular communication networks, and (4) a plurality of intermediate ECUs transversed by one or more of the plurality of routes;

instructions that cause the one or more processors to provide a screen illustrating both representations of the plurality of SND files that make up an entire communication system configuration of the vehicle and a window to enable a user to provide instructions to generate program code for the ECUs within the vehicle's communication system; and instructions that modifies a route for the selected network message based on ECUs to which a first of the plurality of fields is destined, wherein the first of the plurality of fields is destined for an ECU other than the destination ECU;

wherein the plurality of routes connecting the originating ECU to the destination ECU includes (1) a current route and (2) one or more alternative routes; and wherein a first portion of the intermediate ECU are along the current route and are each illustrated to have a first characteristic, and a second portion of the intermediate ECUs are not along the current route but are suitable for use along the current route and are each illustrated to have a second characteristic.

11. The non-transitory computer-readable memory of claim 10, the plurality of instructions further comprising:
instructions that cause the one or more processors to generate a visual message representation for the selected network message, the visual message representation illustrating a plurality of fields of the selected network message.

12. The non-transitory computer-readable memory of claim 11, the plurality of instructions further comprising:
instructions that cause the one or more processors to receive an input from the user to modify a particular field in the plurality of fields of the selected network message;
instructions that cause the one or more processors to, in response to the input from the user to modify the particular field, alter at least one route in the plurality of routes.

13. The non-transitory computer-readable memory of claim 12, the plurality of instructions further comprising:
instructions that cause the one or more processors to automatically generate one or more modified standardized network description files, the modified standard network description files describing the at least one route in the plurality of routes altered in response to the input from the user to modify the particular field.

14. The non-transitory computer-readable memory of claim 13, the plurality of instructions further comprising:
instructions that cause the one or more processors to automatically generate software code for one or more of the plurality of ECUs based on the one or more modified standardized network description files.

15. The non-transitory computer-readable memory of claim 10, wherein the visual signal path representation further illustrates a second destination ECU and a second plurality of routes connecting the originating ECU to the second destination ECU through at least a second portion of the plurality of vehicular communication networks.

16. The non-transitory computer-readable memory of claim 10 wherein the illustrated second characteristic of the second portion of the one or more intermediate ECUs not along the current route but suitable for use along the current route includes hashed boundaries.

17. An apparatus for computer-assisted visualization of network devices, comprising:
at least one processor configured to receive a plurality of standardized network description SND files describing a plurality of vehicular communication networks connecting a plurality of electronic control units (ECU) for a vehicle, each of the plurality of SND files describing a vehicular communication network in the plurality of vehicular communication networks, each vehicular communication network comprising a subset of the plurality of ECUs and one or more network communications paths interconnecting the subset of ECUs, wherein the at least one processor is further configured to automatically generate, based on the plurality of SND files, a visual topology representation of the plurality of vehicular communication networks connecting to the plurality of ECUs, the visual topology representation including at least one ECU connected to at least two vehicular communication networks in the plurality of vehicular communication networks;

wherein the at least one processor is further configured to receive an input from a user to select a network message defined by one or more of the plurality of SND files, the selected network message comprising a plurality of fields, and wherein the at least one processor is further configured to generate a visual signal path representation for the selected network message, the visual signal path representation illustrating (1) an originating ECU, (2) a destination ECU, (3) a plurality of routes connecting the originating ECU to the destination ECU through at least a portion of the plurality of vehicular communication networks, and (4) a plurality of intermediate ECUs transversed by one or more of the plurality of routes;

wherein the at least one processor is further configured to provide a screen illustrating both representations of the plurality of SND files that make up an entire communication system configuration of the vehicle and a window to enable a user to provide instructions to generate program code for the ECUs within the vehicle's communication system; and wherein the at least one processor is further configured to modify a route for the selected network message based on ECUs to which a first of the plurality of fields is destined, wherein the first of the plurality of fields is destined for an ECU other than the destination ECU;

wherein the plurality of routes connecting the originating ECU to the destination ECU includes (1) a current route and (2) one or more alternative routes; and wherein a first portion of the intermediate ECUs are along the current route and are each illustrated to have a first characteristic, and a second portion of the intermediate ECUs are not along the current route but are suitable for use along the current route and are each illustrated to have a second characteristic; and at least one data storage unit configured to communicate with the processor and to store data for the automatically generated visual topology representation.

* * * * *